(12) United States Patent
Short et al.

(10) Patent No.: US 12,544,852 B2
(45) Date of Patent: Feb. 10, 2026

(54) ULTRASONIC SONOTRODE FOR USE IN WELDING COMPLEX GEOMETRIES

(71) Applicant: Agile Ultrasonics Corp., Hilliard, OH (US)

(72) Inventors: Matthew A. Short, Hilliard, OH (US); James Stratton, Hilliard, OH (US)

(*) Notice: Subject to any disclaimer, the term of this patent is extended or adjusted under 35 U.S.C. 154(b) by 0 days.

(21) Appl. No.: 18/373,472

(22) Filed: Sep. 27, 2023

(65) Prior Publication Data

US 2024/0100623 A1 Mar. 28, 2024

Related U.S. Application Data

(60) Provisional application No. 63/410,374, filed on Sep. 27, 2022.

(51) Int. Cl.
*B23K 20/00* (2006.01)
*B23K 20/10* (2006.01)

(52) U.S. Cl.
CPC .................. *B23K 20/106* (2013.01)

(58) Field of Classification Search
CPC . B29C 65/08; B29C 66/73921; B29C 65/081; B23K 20/106; B23K 20/02; B65B 51/225; B65B 51/30
See application file for complete search history.

(56) References Cited

U.S. PATENT DOCUMENTS

| | | | | |
|---|---|---|---|---|
| 3,254,402 A * | 6/1966 | Balamuth | ............... | B29C 65/08 228/171 |
| 3,562,041 A * | 2/1971 | Robertson | ............. | B29C 65/749 228/1.1 |
| 3,699,640 A * | 10/1972 | Cranston | ................ | B23K 20/02 228/5.5 |
| 3,706,126 A * | 12/1972 | Cushman | ............... | B23K 20/02 228/196 |
| 4,607,185 A * | 8/1986 | Elbert | ....................... | B06B 3/00 310/326 |
| 4,786,356 A | 11/1988 | Harris | | |
| 5,730,351 A * | 3/1998 | Hermann | .............. | B29C 66/301 228/1.1 |
| 6,153,964 A * | 11/2000 | Olsson | ................ | B29C 66/9592 310/323.19 |
| 6,247,628 B1 | 6/2001 | Sato et al. | | |
| 6,605,178 B1 * | 8/2003 | Shinohara | ........... | B29C 66/8145 156/580.2 |
| 6,802,920 B2 * | 10/2004 | Shinohara | ............. | B65B 51/225 53/DIG. 2 |
| 9,950,823 B2 * | 4/2018 | Solenthaler | ........... | B65B 51/225 |

(Continued)

OTHER PUBLICATIONS

International Search Report and Written Opinion for International Application No. PCT/US23/33821 dated Jan. 24, 2024, 10 pages.

*Primary Examiner* — Erin B Saad

(57) ABSTRACT

An ultrasonic welding system, comprising at least one sonotrode configured to ultrasonically weld a part or component having a complex geometry, wherein, the at least one sonotrode has a shape generally corresponding to the shape of the part or component to be welded, and wherein the sonotrode includes an input face; an energy input located on the input face; an output face positioned opposite the input face; and a body positioned between the input face and the output face; and wherein the at least one sonotrode has a non-uniform distribution of mass.

15 Claims, 6 Drawing Sheets

(56) References Cited

U.S. PATENT DOCUMENTS

| | | | | |
|---|---|---|---|---|
| 11,090,759 B2* | 8/2021 | Vogler | .................. | B06B 1/0207 |
| 2009/0283570 A1* | 11/2009 | Gerdes | .................... | B29C 65/08 |
| | | | | 228/1.1 |
| 2011/0220292 A1* | 9/2011 | Short | ...................... | B32B 37/00 |
| | | | | 156/580.1 |
| 2014/0033653 A1* | 2/2014 | Cham | ............... | B29C 66/92651 |
| | | | | 156/379.6 |
| 2014/0034213 A1* | 2/2014 | Cham | .................. | B29C 66/232 |
| | | | | 156/580.2 |
| 2015/0210002 A1* | 7/2015 | Short | ................... | H01P 11/007 |
| | | | | 156/580.2 |
| 2018/0345318 A1* | 12/2018 | Miura | ...................... | B06B 3/00 |

* cited by examiner

ULTRASONIC SONOTRODE FOR USE IN WELDING COMPLEX GEOMETRIES

CROSS-REFERENCE TO RELATED APPLICATIONS

This patent application claims the benefit of U.S. Provisional Patent Application Ser. No. 63/410,374 filed on Sep. 27, 2022 and entitled "Ultrasonic Sonotrode Design for Welding Complex Geometries," the disclosure of which is hereby incorporated by reference herein in its entirety and made part of the present U.S. utility patent application for all purposes.

BACKGROUND

The disclosed technology relates in general to systems, devices, and methods used for ultrasonic welding, and more specifically to an ultrasonic sonotrode for use in welding components and parts having complex geometries.

Ultrasonic welding is a well-known industrial process wherein high-frequency ultrasonic acoustic vibrations are locally applied to work pieces that are being held together under pressure for the purpose of creating a solid-state weld. Ultrasonic welding is commonly used for joining plastics and metals, and is particularly useful for joining dissimilar materials. Ultrasonic welding does not require the use of connective bolts, nails, soldering materials, or adhesives to bind materials together. When used to join metals, the welding temperature remains well below the melting point of the involved materials, thereby preventing or greatly reducing unwanted materials properties that may arise from exposing the metals to high temperatures.

Applications of ultrasonic welding are extensive and are found in many industries including electrical and computer, automotive and aerospace, medical, and product packaging. Whether two items or materials can be ultrasonically welded is usually determined by whether or not the thickness of the materials allows the welding process to be effective. Material thickness is particularly important with regard to successful ultrasonic welding of metals. Regardless, wires, microcircuit connections, sheet metal, foils, ribbons and meshes are often successfully joined using various ultrasonic welding techniques. Ultrasonic welding is also commonly used for bonding thermoplastics because the process is fast and easily automated and ventilation to remove heat or exhaust is not required. Ultrasonic welding processes are often used to build assemblies that are too small, too complex, or too delicate to be created using other welding techniques.

Ultrasonic welding systems typically include the following basic elements or system components. First, a press, usually having a pneumatic or electric drive, for assembling parts under pressure. Second, a nest, anvil, or fixture where the parts to be welded are placed and supported and that allows high frequency vibration to be directed to the interfaces between the parts. Fixtures are used to restrict the degrees of freedom of a work piece and should be accurate and stable because the high frequency of vibration may dislocate the work piece from its intended position. Third, an ultrasonic stack that includes a converter or piezoelectric transducer, an optional booster, and an ultrasonic horn or sonotrode. All three elements of the stack are specifically tuned to resonate at the same ultrasonic frequency (e.g., 15, 20, 30, 35 or 40 kHz or greater). The transducer converts high-frequency electrical signals to high-frequency mechanical vibrations using the piezoelectric effect. The booster modifies the amplitude of the vibration mechanically and may be used to clamp the stack in the press. The horn or sonotrode takes the shape of the part to be made, modifies the amplitude mechanically, and applies the mechanical vibration to the parts being welded. Fourth, an electronic ultrasonic generator or power supply for delivering a high-power electrical signal with a frequency matching the resonance frequency of the stack. Fifth, a controller for controlling the movement of the press and the delivery of the ultrasonic energy.

Ultrasonic welding is used for applications involving both similar and dissimilar joints as well as the welding of polymers. The process may be used to produce lap joints in metals, plastic sheets and plastic films in varied shapes as wires (crossed or parallel), ribbons, and flat surfaces. For joining other types of assembles that can be supported on an anvil, unique system configurations can be designed and implemented based on the material used and the part shape desired or required. Modern product design often requires components and parts having complex shapes and geometries. Manufacturers often dismiss the use of ultrasonic technology due to perceived limitations of sonotrode design and capabilities and instead consider the use of flexible technologies such as laser or heat. Accordingly, for configurations used in welding parts having complex geometries, advanced sonotrode designs are highly desirable.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a first ultrasonic welding system comprising at least one sonotrode configured to ultrasonically weld a part or component having a complex geometry, wherein, the at least one sonotrode has a shape generally corresponding to the shape of the part or component to be welded, and wherein the sonotrode includes an input face; an energy input located on the input face; an output face positioned opposite the input face; and a body positioned between the input face and the output face; and wherein the at least one sonotrode has a non-uniform distribution of mass.

Certain implementations further comprise additional mass added to the body of the sonotrode at one or more predetermined locations. Certain implementations further comprise a plurality of slots, which may be vertical, partially vertical, or non-vertical, formed in the body of the sonotrode at predetermined locations. The slots may non-uniformly spaced. Alternately, some of the slots in the plurality of slots may uniformly spaced and other slots within the plurality of slots may be non-uniformly spaced. In certain implementations, the output face has a complex geometry that specifically corresponds to the part or component being welded. The at least one sonotrode may have a resonance between 20- and 100-kHz. In certain implementations, the non-uniform distribution of mass is based on an irregular shape of the sonotrode or an irregular mass distribution of various portions of the sonotrode. In certain implementations, the non-uniform distribution of mass is based on the location of the energy input and the energy input may be intentionally offset from the center of mass of the body. The resonance of the at least one sonotrode having a non-uniform mass results may longitudinal excitation of the output face (second anti-node).

Another implementation of the disclosed technology provides a second ultrasonic welding system, comprising at least one sonotrode configured to ultrasonically weld a part or component having a complex geometry, wherein, the at least one sonotrode has a shape generally corresponding to the shape of the part or component to be welded, and wherein the sonotrode includes an input face; an energy input located on the input face; an output face positioned opposite the input face, wherein the output face has a complex geometry specifically corresponding to the part or component being welded; and a body positioned between the input face and the output face, wherein the body includes a plurality of slots formed therein at predetermined locations; and wherein the at least one sonotrode has a non-uniform distribution of mass.

Certain implementations further comprise additional mass added to the body of the sonotrode at one or more predetermined locations. The slots may non-uniformly spaced. Alternately, some of the slots in the plurality of slots may uniformly spaced and other slots within the plurality of slots may be non-uniformly spaced. The at least one sonotrode may have a resonance between 20- and 100-kHz. In certain implementations, the non-uniform distribution of mass is based on an irregular shape of the sonotrode or an irregular mass distribution of various portions of the sonotrode. In certain implementations, the non-uniform distribution of mass is based on the location of the energy input and the energy input may be intentionally offset from the center of mass of the body. The resonance of the at least one sonotrode having a non-uniform mass results may longitudinal excitation of the output face (second anti-node).

Still another implementation of the disclosed technology provides a third ultrasonic welding system, comprising at least one sonotrode configured to ultrasonically weld a part or component having a complex geometry, wherein, the at least one sonotrode has a shape generally corresponding to the shape of the part or component to be welded, and wherein the sonotrode includes an input face; an energy input located on the input face; an output face positioned opposite the input face, wherein the output face has a complex geometry specifically corresponding to the part or component being welded; and a body positioned between the input face and the output face, wherein the body includes a plurality of slots formed therein, and wherein the body includes distinct regions or portions that are geometrically distinct from one another; and wherein the at least one sonotrode has a non-uniform distribution of mass, and wherein the non-uniform distribution of mass is based on an irregular shape of the sonotrode or an irregular mass distribution of various portions of the sonotrode or the location of the energy input.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and together with the general description given above and detailed description given below, serve to explain the principles of the disclosed subject matter, and wherein.

DETAILED DESCRIPTION

Figure 1A:
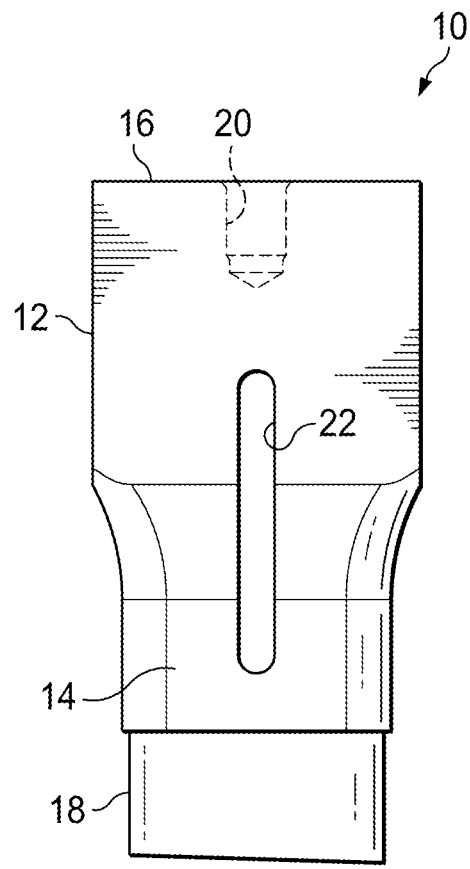
FIG. 1A is a top view of an example a prior art sonotrode of the type used in ultrasonic welding processes.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The disclosed technology provides sonotrodes for use in ultrasonic welding applications directed to the creation of parts or components having complex shapes or geometries.

These sonotrodes can be incorporated into fully functional ultrasonic transmission lines that operate in a pure longitudinal manner while the sonotrode itself is intentionally unbalanced in design.

Figure 1B:
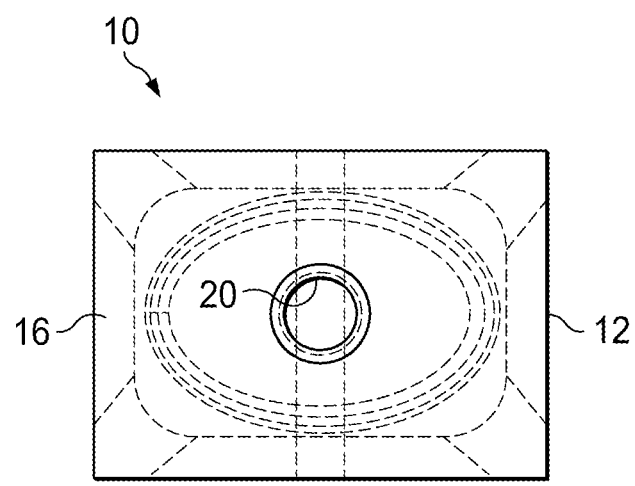
FIG. 1B is a front view of the sonotrode of FIG. 1A.

FIG. 1A provides a top view of an example prior art sonotrode used in ultrasonic welding processes; and FIG. 1B provides a front view of the sonotrode of FIG. 1A. The sonotrode shown in FIGS. 1A-1B includes a generally symmetrical body formed around a centrally located mounting stud to which a source of ultrasonic energy is attached. In these Figures, sonotrode 10 includes upper portion 12, lower portion 14, input face 16, output face 18, and cavity for mounting stud 20. Although the geometry of sonotrode 10 is not perfectly square, the mass at any point away from mounting stud cavity 20 is relatively the same as the mass at the opposing side (output face 18). FIG. 1B illustrates this relationship as well, wherein sonotrode 10 exhibits a substantially balanced three-dimensional mass, i.e., all mass is distributed evenly around a center point. As will be appreciated by one of ordinary skill in the art, subtle or substantial mass differences between upper portion 12 and lower portion 14 or output face 18, are purposely implemented to influence output displacement. Changing the mass difference between an upper quarter wavelength and a lower quarter wavelength of a half wavelength system is a common practice with regard to sonotrode design.

Sonotrode 10 also includes cross slot 22 formed in the body thereof. Due to Poisson's effect, excessive radial vibration occurs at the nodal point of the sonotrode if the width or diameter of the sonotrode extends much beyond the quarter wavelength dimension of the overall half wavelength. A cross slot formed in the body of a sonotrode intentionally redistributes the mass of the body, thereby moderating the Poisson effect and creating more longitudinal motion. Known sonotrode design techniques require cross slots to be precisely and evenly positioned within the sonotrode body to promote balanced motion within the body and to create uniform displacement across the output displacement face.

Figure 2:
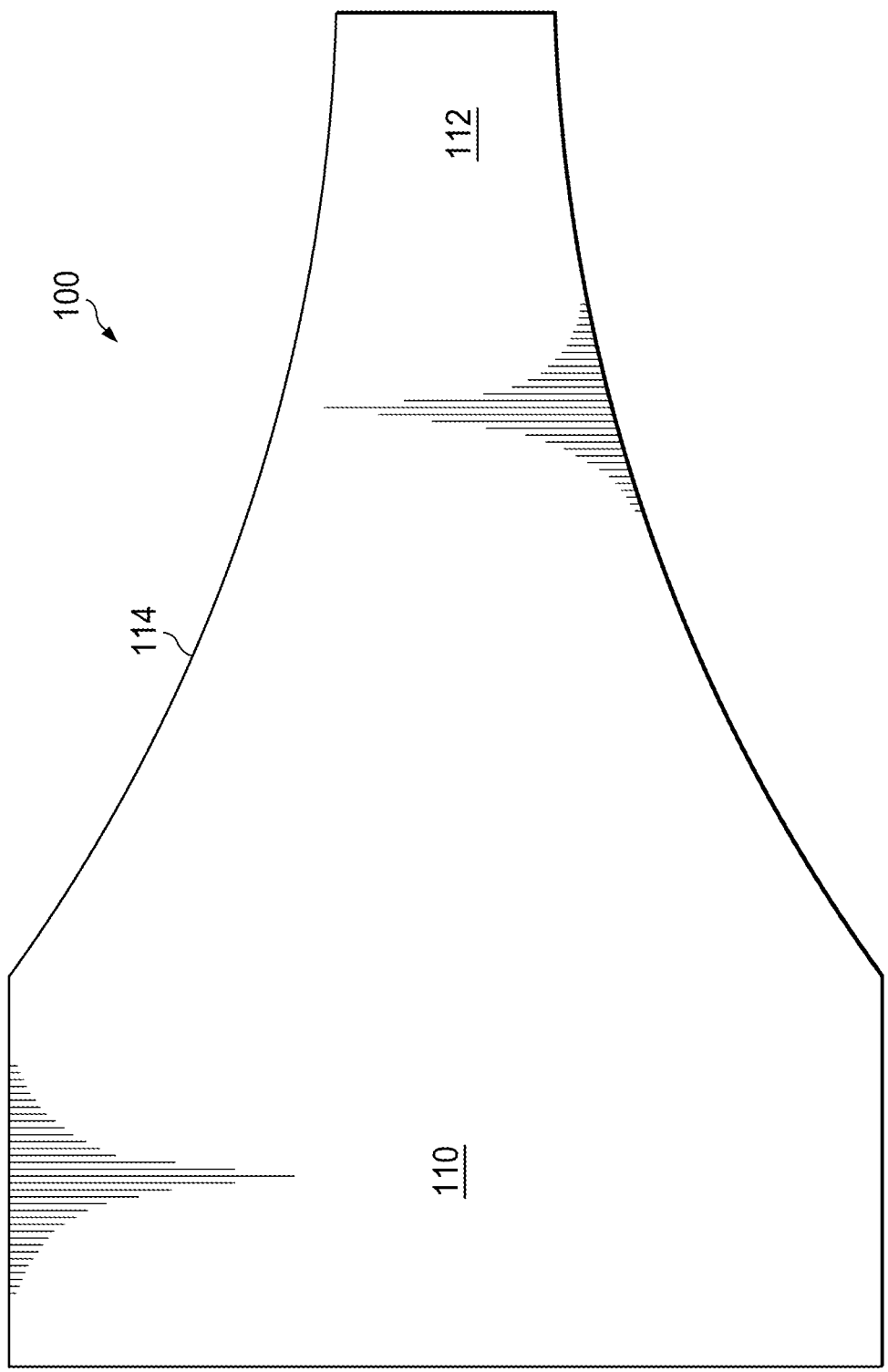
FIG. 2 is a top view of an example welded part having a complex, non-uniform geometry.

FIG. 2 is a top view of an example welded part having a complex, non-uniform geometry resembling the seat of a bicycle or similar item. The prior art sonotrode of FIGS. 1A-1B, which exhibits a substantially balanced three-dimensional mass, would not be suitable for creating welded part 100, which includes wide portion 110, tapered portion 112, and the overall shape defined by outline or perimeter 114. Wide portion 110 conforms to traditional aspects of sonotrode design with the portion nearly balanced around the center of mass. However, tapered portion 112 is grossly unbalanced and the center of mass of the entire part is shifted slightly to the right of wide portion 110 due to the increased mass of tapered portion 112. If a traditional sonotrode was used to weld this part, the non-uniformity of mass of the part would induce parasitic modes such as bending or flexural modes that often couple with a longitudinal mode. Driving such a sonotrode with bending, flexural, shear, or torsional modes, or coupling one of these modes with a longitudinal mode would result in overloading conditions as the primary driving source struggles to maintain frequency lock for maintaining resonance. The most extreme cases would result in catastrophic failure of the transducer due to non-uniform motion being transferred to the piezoelectric stack of ceramics, thereby resulting in fractured disks.

Figure 3:
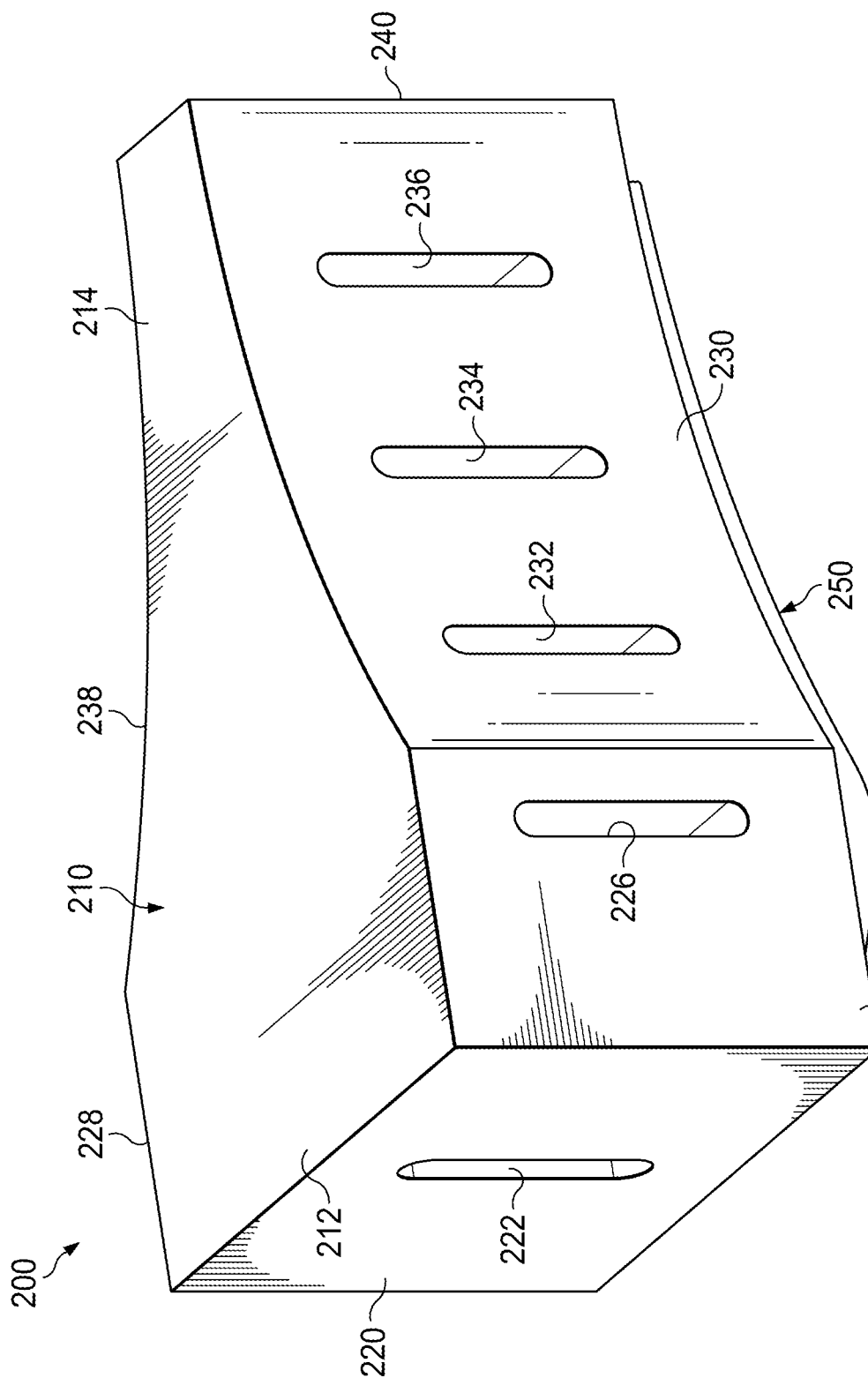
FIG. 3 is a perspective view of an example implementation of the disclosed sonotrode, wherein the overall shape and mass distribution of the sonotrode is non-uniform and corresponds to the specific geometry of the part shown in FIG. 2.
Figure 4:
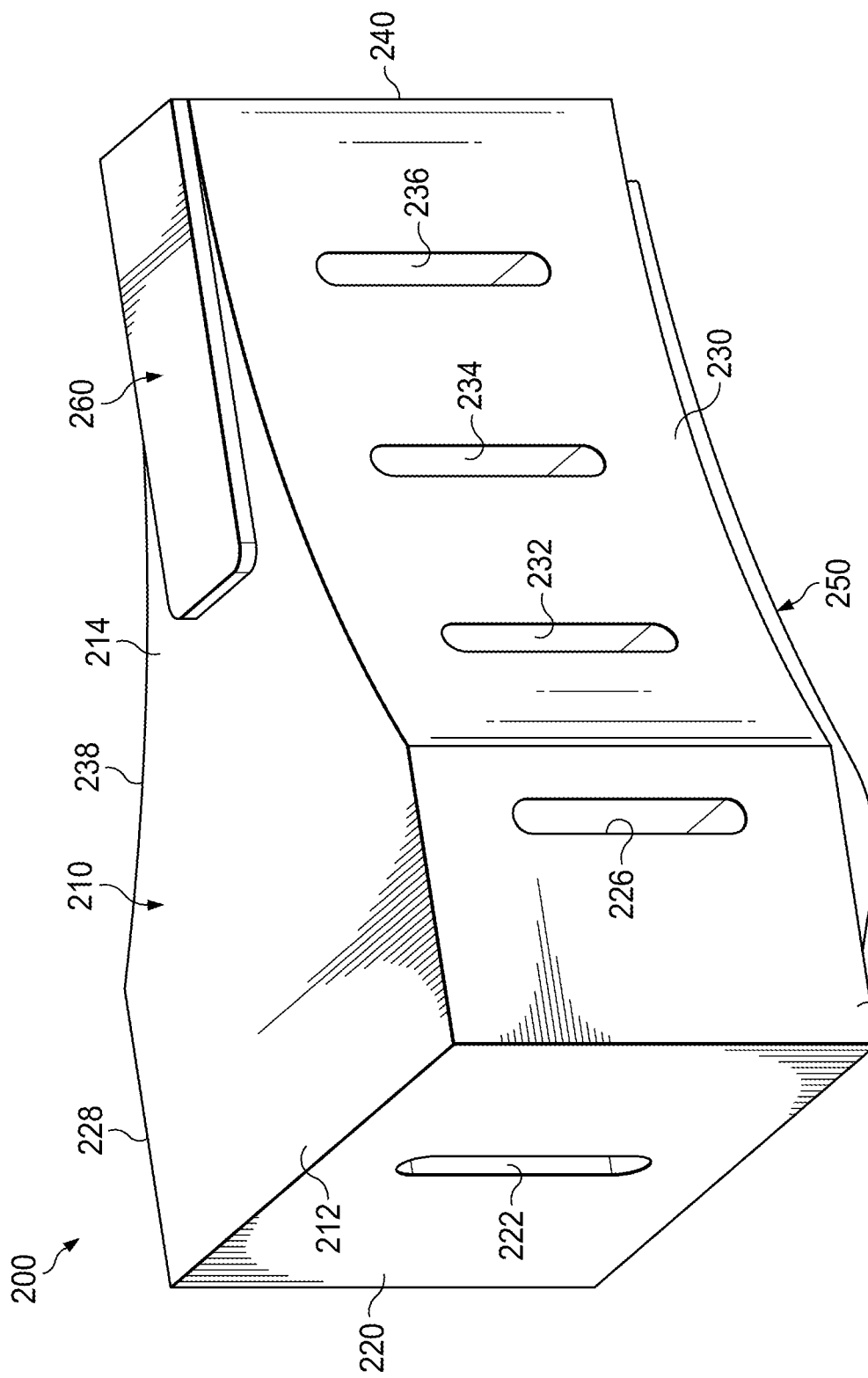
FIG. 4 is a perspective view of the sonotrode of FIG. 3, wherein additional mass has been added to the tapered portion of the sonotrode.
Figure 5:
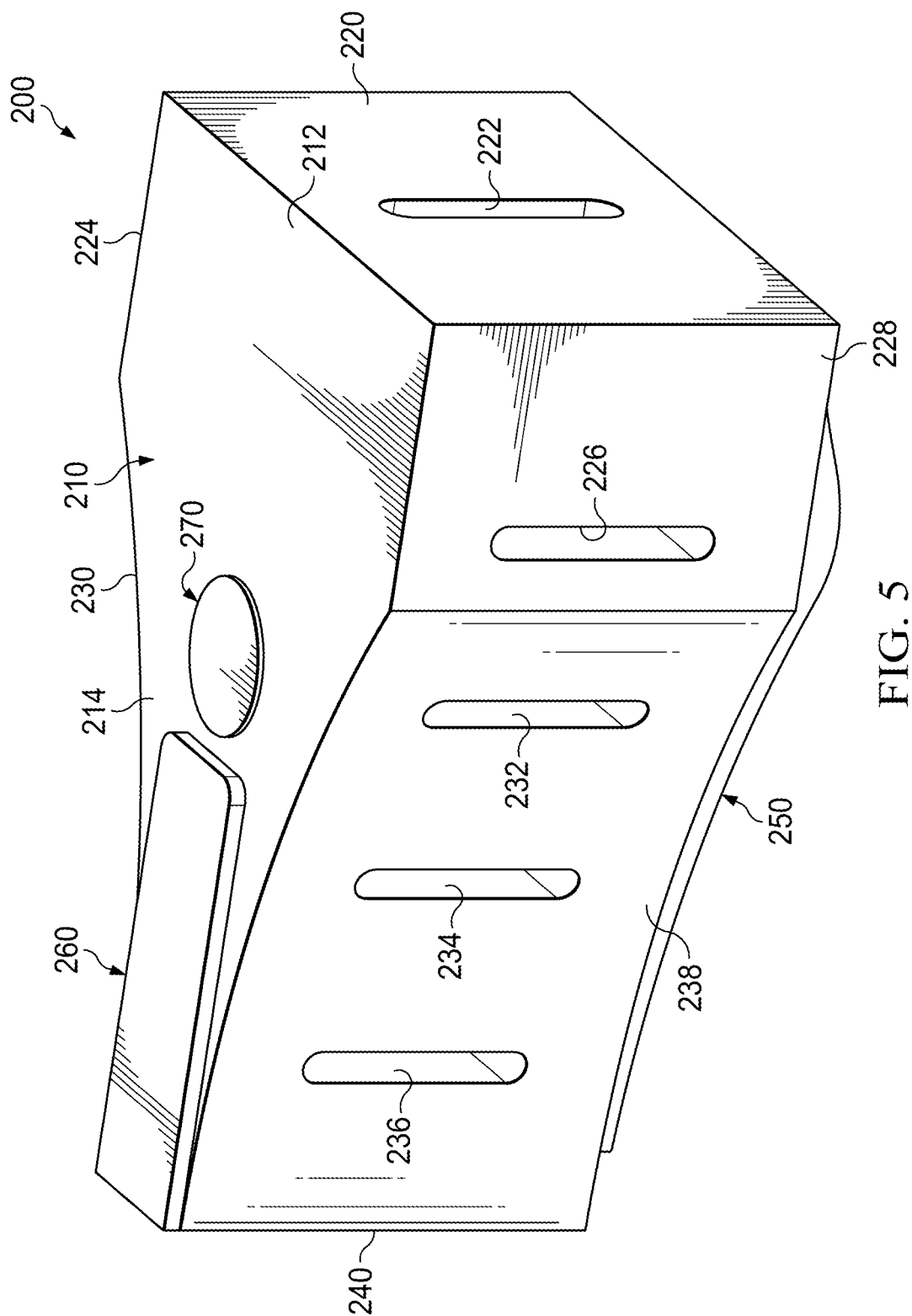
FIG. 5 is a perspective view the sonotrode of FIG. 4, wherein an attachment point for the input of ultrasonic energy has been added to the input face of the sonotrode.
Figure 6:
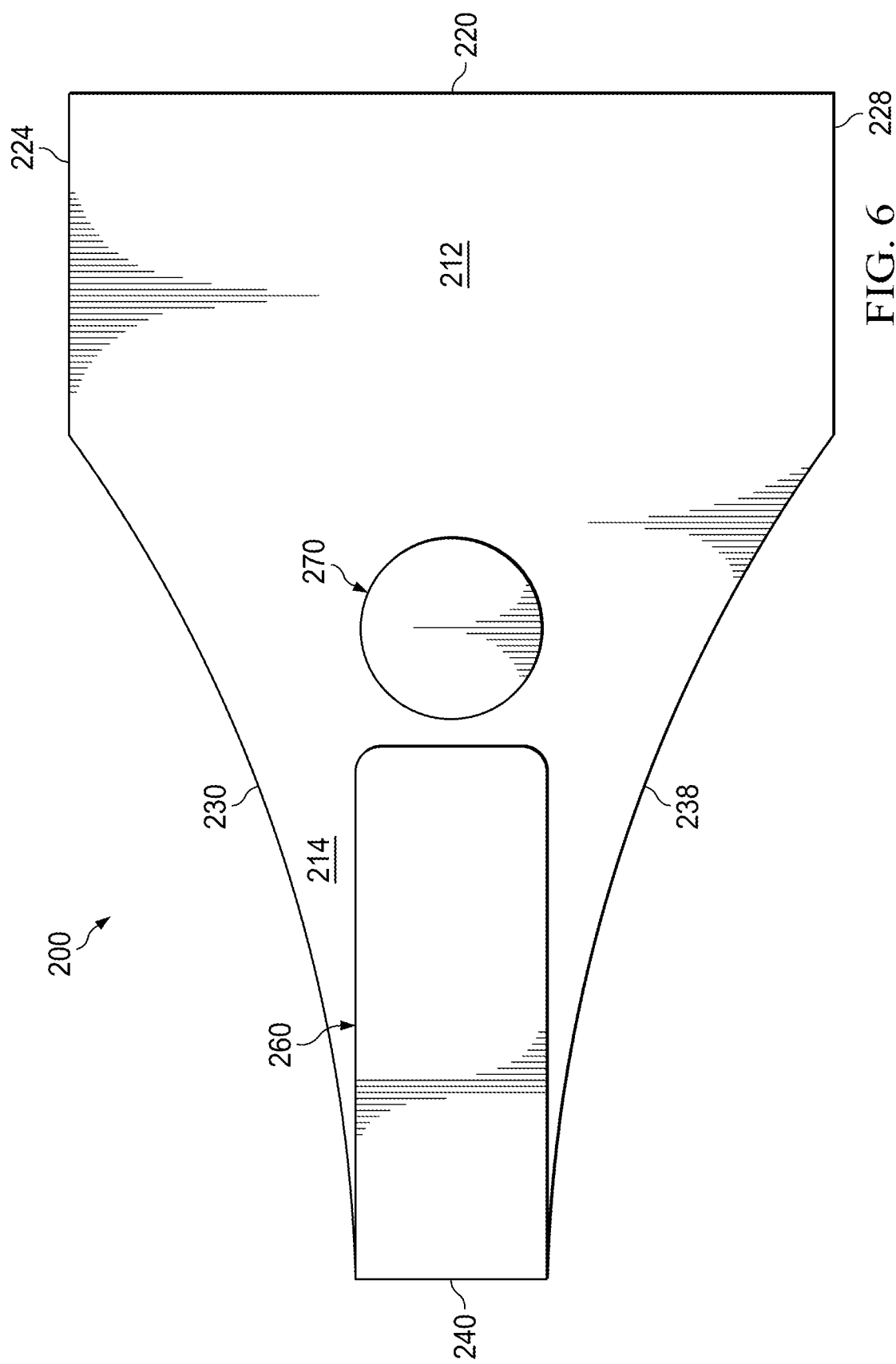
FIG. 6 is a top view of the sonotrode of FIG. 5.

The ultrasonic sonotrodes disclosed herein may be used to ultrasonically weld parts or components having complex geometries such as the item shown in FIG. 2. The design of these sonotrodes divides a complex or complicated design into individual subcomponents that are ultimately integrated with one another to vibrate seamlessly as a uniform body. FIG. 3 provides a perspective view of an example implementation of the disclosed sonotrode, wherein the sonotrode includes a portion having a shape that corresponds to a more conventional bar sonotrode and a portion that corresponds to the specific unique geometry of the part shown in FIG. 2. As shown in FIG. 3, non-uniform sonotrode 200 includes input face 210; wide portion 212; tapered portion 214; rear face 220 in which slot 222 is formed; first side of wide portion 224 in which slot 226 is formed; second side of wide portion 228 in which slot 226 is formed; first side of tapered portion 230 in which slots 232, 234, and 236 are formed; second side of tapered portion 238 in which slots 232, 234, and 236; front face 240; and contoured output face 250, which corresponds to the actual shape of the component being made. Slots 232, 234, and 236 are uniformly spaced; however, slot 226 is intentionally offset to redistribute mass in a predetermined manner. FIG. 4 provides a perspective view of the sonotrode of FIG. 3, wherein additional mass 260 has been added to the tapered portion of the sonotrode. FIG. 5 provides a perspective view the sonotrode of FIG. 4, wherein attachment 270 for the input of ultrasonic energy has been added to the input face of the sonotrode; and FIG. 6 provides a top view of the sonotrode of FIG. 5.

With regard to the sonotrode depicted in FIG. 3, due to the increased mass of wide portion 212, a modification is made to the far end region of tapered portion 214 where negligible longitudinal motion would be exhibited. This modification adds additional mass to the upper quarter wavelength of sonotrode 200 for increasing the mass difference between the upper quarter wavelength and the lower quarter wavelength of sonotrode 200. As shown in FIG. 4, additional mass 260 is calculated only against the far end region of tapered portion 214 and applied to the upper most region of the quarter wavelength. Wide portion 212 exhibits more conventional sonotrode behavior due to the mass of the sonotrode body being efficiently balanced. However, the complex surface geometry of contoured output displacement face 250 reduces the amount of gain when compared against the nodal region of sonotrode 200. As shown in FIGS. 5-6, the location (270) at which ultrasonic energy is applied to sonotrode 200 is offset with respect to the overall center of mass because while the source of ultrasonic energy could be applied to the center of mass of input face 210, poor performance would result because the connection is not at the point of maximum displacement for input face 210. As shown in FIG. 6, mounting stud attachment 270 is offset from the center of mass, but is located at the point of maximum displacement, thereby achieving optimal longitudinal motion while driving with the least amount of system loss.

Although the design of non-uniform sonotrode 200 corresponds directly to the complex geometry shown in FIG. 2, the same design principles may be applied to many different shapes and geometries (e.g., round, octagonal, rectangular, square, etc.) so that various complex components or parts may be made using unbalanced or non-uniform sonotrodes.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the Figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection, a direct connection, or an indirect connection through an intermediate medium. For one of ordinary skill in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. An ultrasonic welding system, comprising:
   (a) at least one sonotrode configured to ultrasonically weld a part or component having a non-uniform geometry,
   (b) wherein, the at least one sonotrode has a shape corresponding to the shape of the part or component to be welded, and wherein the sonotrode includes:
      (i) an input face having a wide portion and a tapered portion distinct from the wide portion;
      (ii) a single energy input located on the input face;
      (iii) an output face positioned opposite the input face;
      (iv) a body positioned between the input face and the output face; and
      (v) additional mass added to the tapered portion of the input face of the sonotrode at one or more predetermined locations, wherein the additional mass is distinct from the single energy input; and
   (c) wherein the at least one sonotrode has a non-uniform distribution of mass, wherein the non-uniform distribution of mass is based on the location of the single energy input, and wherein the single energy input is intentionally offset from the center of mass of the body.

2. The ultrasonic welding system of claim 1, further comprising a plurality of slots formed in the body of the sonotrode at predetermined locations, wherein some of the slots in the plurality of slots are formed in a tapered portion of the body, and other slots within the plurality of slots are formed in a wide portion of the body, and wherein the tapered portion of the body is distinct from the wide portion of the body.

3. The ultrasonic welding system of claim 2, wherein the slots are non-uniformly spaced.

4. The ultrasonic welding system of claim 2, wherein some of the slots in the plurality of slots are uniformly spaced and other slots within the plurality of slots are non-uniformly spaced.

5. The ultrasonic welding system of claim 1, wherein the output face has a geometry that specifically corresponds to the part or component being welded.

6. The ultrasonic welding system of claim 1, wherein the at least one sonotrode has a resonance between 20- and 100-kHz.

7. The ultrasonic welding system of claim 1, wherein the non-uniform distribution of mass is based on an irregular shape of the sonotrode or an irregular mass distribution of various portions of the sonotrode.

8. The ultrasonic welding system of claim 1, wherein resonance of the at least one sonotrode having a non-uniform mass results in longitudinal excitation of the output face.

9. An ultrasonic welding system, comprising:
(a) at least one sonotrode configured to ultrasonically weld a part or component having a non-uniform geometry,
(b) wherein, the at least one sonotrode has a shape corresponding to the shape of the part or component to be welded, and wherein the sonotrode includes:
  (i) an input face having a wide portion and a tapered portion distinct from the wide portion;
  (ii) a single energy input located on the input face;
  (iii) an output face positioned opposite the input face, wherein the output face has a geometry specifically corresponding to the part or component being welded;
  (iv) a body positioned between the input face and the output face, wherein the body includes a plurality of slots formed therein at predetermined locations; and
  (v) additional mass distinct from the single energy input added to the tapered portion of the input face of the sonotrode at one or more predetermined locations thereon; and
(c) wherein the at least one sonotrode has a non-uniform distribution of mass, wherein the non-uniform distribution of mass is based on the location of the single energy input, and wherein the single energy input is intentionally offset from the center of mass of the body.

10. The ultrasonic welding system of claim 9, wherein the slots are non-uniformly spaced.

11. The ultrasonic welding system of claim 9, wherein some of the slots in the plurality of slots are uniformly spaced and other slots within the plurality of slots are non-uniformly spaced.

12. The ultrasonic welding system of claim 9, wherein the at least one sonotrode has a resonance between 20- and 100-kHz.

13. The ultrasonic welding system of claim 9, wherein the non-uniform distribution of mass is based on an irregular shape of the sonotrode or an irregular mass distribution of various portions of the sonotrode.

14. The ultrasonic welding system of claim 9, wherein resonance of the at least one sonotrode having a non-uniform mass results in longitudinal excitation of the output face.

15. An ultrasonic welding system, comprising:
(a) at least one sonotrode configured to ultrasonically weld a part or component having a non-uniform geometry,
(b) wherein, the at least one sonotrode has a shape corresponding to the shape of the part or component to be welded, and wherein the sonotrode includes:
  (i) an input face having a wide portion and a tapered portion distinct from the wide portion;
  (ii) a single energy input located on the input face;
  (iii) an output face positioned opposite the input face, wherein the output face has a geometry specifically corresponding to the part or component being welded;
  (iv) a body positioned between the input face and the output face, wherein the body includes a plurality of slots formed therein, and wherein the body includes distinct regions or portions that are geometrically distinct from one another; and
  (v) additional mass distinct from the single energy input added to the tapered portion of the input face of the sonotrode at one or more predetermined locations thereon; and
(c) wherein the at least one sonotrode has a non-uniform distribution of mass, and wherein the non-uniform distribution of mass is based on an irregular shape of the sonotrode or an irregular mass distribution of various portions of the sonotrode or the location of the single energy input.

* * * * *